3,704,273
FLAME RESISTANT LATEX AND EMULSION SYSTEMS AND THE PRODUCTS FORMED THEREFROM

William C. Arney, Jr., St. Albans, W. Va., assignor to Union Carbide Corporation, New York, N.Y.
No Drawing. Filed May 11, 1970, Ser. No. 36,441
Int. Cl. C08g 51/24; C09d 5/18
U.S. Cl. 260—29.4 R          3 Claims

ABSTRACT OF THE DISCLOSURE

Latex and emulsion systems rendered highly flame resistant by treatment with certain phosphorus polyol compounds combined with a flame resistance enhancement agent. Halogen containing (particularly bromine) compounds, such as tetrabromophthalic anhydride, and nitrogen containing compounds, such as dicyanamide, have been found to be extremely effective flame resistance enhancement agents. By the aforementioned treatment of latex and emulsion systems, for example, acrylic crushed foam coatings on fiberglass fabric can be made flame resistant to a degree not achieved heretofore.

BACKGROUND OF THE INVENTION

(1) Field of the invention

This invention relates to flame resistant latex and emulsion systems and to the products made therefrom.

(2) Description of the prior art

In recent years, latex and emulsion systems have been found to be very useful in a wide variety of applications. These include coatings of many kinds, varied textile applications and adhesive and laminate products, merely to name a few. A serious deficiency in many of these systems, however, is the inherent flammability of the products derived therefrom. While in the past, a variety of inorganic salts have been added to latex and emulsion systems in an attempt to impart flame resistance thereto, e.g. ammonium phosphate, ammonium phosphorus pentoxide, ammonium bromide, phosphoryl chloride and other salts of ammonia, these materials have had limited application due to their incompatibility with most latex and emulsion systems. Similarly, several organophosphorus and organohalogens have been utilized in an effort to impart flame resistance to latex and emulsion systems. These include halopropylphosphonates, chlorinated paraffins and bis-(2,3-dibromopropyl)phthalate. However, these too suffer from problems of incompatibility with most latex and emulsion systems and in many cases extremely high cost. Therefore, it would be highly desirable if materials could be found that could be compatibly incorporated into these latex and emulsion systems and which would, at the same time, render the systems and products derived therefrom highly flame resistant. Moreover, these flame retardants would have to overcome the problems existent with the additives used heretofore. As mentioned, these include high cost, incompatibility with the latex or emulsion systems, as well as inefficient flame retarding effect, alteration of desirable characteristics of the product, and the like.

SUMMARY OF THE INVENTION

It is therefore among one of the principal objectives of this invention to provide materials which can be incorporated into latex or emulsion systems and which render the systems and products derived therefrom flame resistant to a degree never achieved, and moreover, to provide materials which are compatible with the latex and emulsion systems, have little or no effect on the desirable characteristics of the product, and are relatively inexpensive to employ.

In accord with the invention, there have now been discovered novel flame resistant latex and emulsion systems and products formed by the addition, to the latex or emulsion products, of certain flame resistance enhanced phosphorus polyol compounds, prepared by reacting elemental phosphorus with an alcohol or mercaptan and an epoxide or episulfide in the presence of a basic catalyst to obtain the phosphorus polyol, and combining that product with a flame resistance enhancement agent. Especially useful flame resistance enhancement agents have been found to be halogen containing (particularly bromine) compounds, such as tetrabromophthalic anhydride, chlorendic anhydride, tris-2,3-dibromopropyl phosphate, 2,3-dibromopropanol and the like. Another especially useful class of flame resistance enhancement agents have been found to be nitrogen containing compounds such as urea, cyanamide, tri-methylolmelamine, dicyanamide and the like. While the phosphorus polyol compounds per se have been known to exhibit flame resistant properties, the addition of these flame resistance enhancement agents thereto has yielded products of unexpectedly high flame resistance.

DESCRIPTION OF THE SPECIFIC EMBODIMENTS

The phosphorus polyol compounds, i.e. phosphorus containing alcohols (or thiols), of the invention may be prepared from elemental phosphorus by a process as described in copending U.S. application Ser. No. 886,037, filed Dec. 17, 1969 in the name of Chisung Wu and assigned to a common assignee, now U.S. Pat. No. 3,644,595 which is a continuation-in-part of application Ser. No. 527,492, filed Feb. 15, 1966, and now abandoned. In that application, the process comprises reacting elemental phosphorus with an alcohol or mercaptan and an epoxide or episulfide in the presence of a basic catalyst to produce thereby an organophosphorus composition (the phosphorus polyols referred to hereinabove). Typical alcohols are disclosed as being methanol, ethanol and isopropyl alcohol, while typical mercaptans are disclosed as being methyl mercaptan and butyl mercaptan, merely to name a few illustrative examples. Typical epoxides are disclosed as being epoxalkanes, such as ethylene oxide, propylene oxide and butylene oxide; also epithioalkanes are disclosed as useful, such as ethylene sulfide and propylene sulfide, merely to name several illustrative examples of this third reactant.

According to one desirable embodiment of the said copending application, the organophosphorus compositions obtained are post-treated with an aldehyde, e.g. formaldehyde is highly preferred, in order to convert substantially all of the phosphinous hydrogen (i.e. hydrogen bonded directly to phosphorus) to hydroxy methyl (including substituted hydroxy methyl) groups. These post-treated organophosphorus compositions are particularly preferred in practicing the method of the present invention. The aforementioned reactions are thoroughly described in the aforesaid copending application and need not be further described here except as a point of reference with regard to the present invention flame resistant latex and emulsion systems.

The latex systems contemplated within the scope of the present invention may be defined as a dispersion of one or more solids (usually an organic polymer) in solvent systems with the solid being in a particle form ranging in size from about 10 to 20,000 angstrom units, whereas, the emulsions may be defined as a system of two or more immiscible liquids (or liquid/solid) one or more of which is dispersed in the form of small drops. While these definitions are essentially complete, on the other hand, those systems consisting of one or more meterials, dispersed in some medium, and which are commonly called latexes or emulsions by those skilled in the art, are also contemplated as coming within the scope of the invention. The latter have also been termed dispersions, suspensions, colloidal systems and the like. Illustrative examples of latex and emulsion systems are dispersions of styrene-butadiene rubbers, caprolactone, caprolactone-based polymers, acrylic and methacrylic polymers and copolymers, vinyl polymers and copolymers, polyolefins, polyurethanes, natural rubbers, neoprenes, butadiene-acrylonitriles and the like.

Additional materials may be incorporated into the latex (or emulsion) flame resistance enhanced phosphorus polyol systems to produce specific characteristics, such as surfactants or emulsifiers to stabilize the latex or emulsion, and pigments to provide color.

The critical amounts of phosphorus polyol and flame resistance enhancement agent which must be added to the latex or emulsion will be a function of the particular flame resistance enhancement agent employed, as well as the inherent flammability of the untreated material and the degree of flame resistance desired. Thus, the total weight percent of phosphorus polyol and flame resistance enhancement agent to the wet latex or emulsion may range from about 1 to about 75 percent, with the preferred range being between about 5 and 40 percent. Similarly, the weight ratio of phosphorus polyol to flame resistance enhancement agent may vary between about 0.025 and about 40 weight percent, with the preferred range being between about 0.1 and 10. According to a specific and preferred embodiment of the invention, a phosphorus polyol compound, such as one prepared according to the method described in the aforesaid copending U.S. application, is combined with a flame resistance enhancement agent. One such extremely useful agent has been found to be halogen (particularly bromine) containing compound. Typical of these may be listed as tetrabromophthalic anhydride, tris-2,3-(dibromopropyl) phosphate, 2,3-dibromopropanol and pentabromophenol.

Another especially useful flame resistance enhancement agent has been found to be a nitrogen containing compound such as urea, cyanamide or dicyanamide.

The phosphorus polyol employed will be selected according to the end product desired. For example, for semi-flexible foams or for rigid foams, polyols having average hydroxyl numbers of from about 70 to 150 or from about 125 to 7000, respectively, are useful. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where

OH = hydroxyl number of the polyol
$f$ = average functionality, that is average number of hydroxyl groups per molecule of polyol
M.W. = average molecular weight of the polyol.

The latexes and emulsions which are included within the scope of this invention have found very wide utility. The added property of inexpensive, durable and efficient flame resistance is a most desirable feature to many of the applications. Included in these applications are flame resistant acrylic or urethane coatings used in various textile products, acrylic or urethane binders in non-woven applications, acrylic softeners, applied to fabrics, flame resistant paints and enamels, binders in paper manufacture, wide varieties of molded articles from natural and synthetic leathers, wax emulsions, printing inks, acoustical tile and board finishes, lacquers, various films, adhesive applications in general, various laminates and the like. In a particularly desirable embodiment of the invention, a phosphorus polyol derived from phosphorus, ethylene oxide, methanol and formaldehyde which has been combined with a flame enhancing agent, such as tetrabromophthalic anhydride, is added to an acrylic latex system; the resulting mixture is foamed and the foam is then spread onto a sheet of fiberglass. After heat-curing, the material so treated will have extraordinarily high flame resistance. Thus, by this embodiment, acrylic crushed foam coatings on fiberglass fabric (wherein the acrylic coating is crushed between rubber rollers and heat cured by means well known to the art) can be made flame resistant to a degree not achieved heretofore. Indeed, prior to the present invention, acrylic crushed foam coatings applied to non-flammable substrates, such as fiberglass fabric, have been very difficult to render flame resistant. In view of the wide usage of fiberglass fabric it can be seen that the inventive contribution is of tremendous importance to the industry.

The invention will be more fully understood in conjunction with the following illustrative examples:

EXAMPLE 1

To 100 parts of acrylate-clay latex formulation were added 10 parts of a phosphorus polyol prepared from elemental phosphorus, ethylene oxide and methanol which had been post-treated with formaldehyde as indicated in copending U.S. application Ser. No. 527,492 (hydroxyl number=450, percent phosphorus=21); and 10 parts of tris-2,3-dibromopropyl phosphate. The mixture was coated onto a fiberglass fabric and cured five minutes at 175° C. in order to obtain the latex product in a form convenient for testing. This coated substrate was then subjected to testing in a General Electric Flammability Tester by the methods described by Fenimore and Martin (Combustion and Flame, 10, 135 (1966)). The results of this test are reported in terms of the limiting oxygen index (LOI) which is the lowest ratio of oxygen to nitrogen necessary to support combustion. Furthermore, the coated substrate was subjected to a vertical flame test (AATCC 34–1966) with the highest point of burning being reported in inches from the bottom of the sample (clear length). The LOI value obtained 0.358, was compared to a value of 0.255 obtained for a coating containing no flame retarding materials, and a value of 0.275 obtained for a coating containing 20 parts of phosphorus polyol alone. The clear length of the coating containing the phosphorus polyol and dibromopropylphosphate was found to be 3.75 inches, as compared to the coating containing no flame retarding materials which burned its entire length.

EXAMPLE 2

A coating was prepared and tested as in Example 1, except that 10 parts of 2,3-dibromopropanol were used as the halogen source instead of the dibromopropylphosphate. The LOI value obtained was 0.306 and the clear length was 1 inch.

EXAMPLE 3

A coating was prepared and tested in Example 1, except that 10 parts of cyanamide (contained in 10 parts water) replaced the dibromopropylphosphate. The LOI value obtained was 0.294 and the clear length of the sample was 2.75 inches.

EXAMPLE 4

A coating was prepared and tested as in Example 1, except that 10 parts of urea in 20 parts of water replaced the dibromopropylphosphate. The LOI of the resultant coating was 0.316 and the clear length was 2 inches.

EXAMPLE 5

A coating was prepared and tested as in Example 1, except that 10 parts of dicyanamide replaced the 2,3-dibromopropylphosphate. The LOI of the resultant coating was 0.302 and the clear length was 0.5 inch.

EXAMPLE 6

A coating was prepared and tested as in Example 1, except that 10 parts trimethylolmealmine (as 80% aqueous solution) replaced the dibromopropylphosphate. The LOI of the resultant coating was 0.326 and the clear length was 4 inches.

EXAMPLE 7

The phosphorus polyol indicated in Example 1 was heated with 13.44 gms. of tetrabromophthalic anhydride at 90° C. overnight. The residue was treated with enough water to give 100 gms. total weight, and sodium bicarbonate was added to effect solution of the material, 20 gms. of this solution was then added to 50 gms. of a 50 percent acrylic-based latex and the mixture was foamed. The flame resistance of the acrylate coating on fiberglass was tested by the vertical flame test of Example 1 and a clear length of 3 inches was obtained. An untreated coating (i.e., without a flame resistance enhancement agent incorporated therein) burned its entire length.

EXAMPLE 8

The latex system of Example 1 (100 parts) was combined with 10 parts of a phosphorus polyol (prepared from elemental phosphorus, propylene oxide and methanol, post-treated with formaldehyde as described in copending U.S. application Ser. No. 527,492), and 10 parts of chlorendic anhydride. A fiberglass fabric coated with this mixture was cured and subjected to the vertical flame tests as in Example 1, giving a clear length of 1 inch and an LOI value of 0.294.

EXAMPLE 9

The latex of Example 7 (100 parts) was mixed with the phosphorus polyol of Example 1 (10 parts) and pentabromophenol. After forming a coating of fiberglass fabric as in Example 1, the sample was subjected to the vertical flame and displayed a clear length of 4 inches.

Table 1 below summarizes the results of Examples 1 through 9.

TABLE 1

| Coating | Additive | LOI | Clear length, inches |
|---|---|---|---|
| Example: | | | |
| 1 | (a) Tris-2,3-dibromopropylphosphate | 0.358 | 3.75 |
|   | (b) Phosphorus polyol | 0.275 | |
|   | (c) None | 0.255 | (1) |
| 2 | 2,3-dibromopropanol | 0.306 | 1 |
| 3 | Cyanamide | 0.294 | 2.75 |
| 4 | Urea | 0.316 | 2 |
| 5 | Dicyanamide | 0.302 | 0.5 |
| 6 | Trimethylolmelamine | 0.326 | 4 |
| 7 | Tetrabromophthalic anhydride | | 3 |
| 8 | Chlorendic anhydride | 0.294 | 1 |
| 9 | Pentabromophenol | | 4 |

1 Burned its entire length.

The results are significant. It is to be noted that in each coating containing a flame resistance enhancement agent according to the invention that the amount of oxygen needed, as indicated by the higher LOI values, to sustain combustion, is much greater than in the coatings containing either phosphorus polyol alone, or no additive at all. Note that in the latter instance, the coated sample burned its entire length.

What is claimed is:

1. In a flame resistant latex system comprising a latex substrate having incorporated therein a flame resistance agent the improvement comprising utilizing as the flame resistance agent a phosphorus polyol produced by the process which comprises reacting (a) phosphorus, (b) an epoxide or an epithioalkane, and (c) an alcohol, in the presence of a catalytic quantity of a base, and a flame resistance enhancement agent selected from the group consisting of urea, cyanamide, trimethylolmelamine, dicyanamide and tetrabromophthalic anhydride, tris-2,3-dibromopropylphosphate, 2,3 - dibromopropanol, and pentabromophenol.

2. A flame resistant latex system according to claim 1 wherein said phosphorus polyol is post-treated with formaldehyde and thereafter combined with said flame resistance enhancement agent.

3. A flame resistant latex system according to claim 1 wherein the amount of said phosphorus polyol compound and flame resistance enhancement agent is between about 1 and about 75 weight percent of said substrate material, said flame resistance enhancement agent in turn being present in amounts between 0.025 and about 40 weight percent of said phosphorus polyol.

References Cited

UNITED STATES PATENTS

| | | | |
|---|---|---|---|
| 3,449,161 | 6/1969 | Hindersinn et al. | 106—15 X |
| 3,513,114 | 5/1970 | Hahn et al. | 106—15 X |

LORENZO B. HAYES, Primary Examiner

U.S. Cl. X.R.

106—15 FP; 260—29.2 R, 29.6 R, 29.6 XA, 29.7 R, 45.7 P, 45.8 N